United States Patent [19]

Knipp et al.

[11] Patent Number: 4,917,744
[45] Date of Patent: Apr. 17, 1990

[54] METHOD OF MAKING A TIRE REINFORCED WITH SHEATH CORD THREADS

[75] Inventors: Ulrich Knipp, Bergisch-Gladbach; Otto Ganster, Leverkusen, both of Fed. Rep. of Germany

[73] Assignee: Bayer Aktiengesellschaft, Bayerwerk, Fed. Rep. of Germany

[21] Appl. No.: 213,666

[22] Filed: Jun. 30, 1988

Related U.S. Application Data

[63] Continuation of Ser. No. 851,854, Apr. 14, 1986, abandoned, and a continuation-in-part of Ser. No. 789,676, Oct. 21, 1985, abandoned, which is a continuation of Ser. No. 532,412, Sep. 15, 1983, abandoned.

[30] Foreign Application Priority Data

Jun. 21, 1983 [DE] Fed. Rep. of Germany ....... 3322266

[51] Int. Cl.$^4$ ................ B29D 30/00; B29D 30/08; B60C 9/07
[52] U.S. Cl. ................ 156/117; 156/397; 152/562
[58] Field of Search .......... 156/117, 397, 123; 152/557, 562; 264/103, 326

[56] References Cited

U.S. PATENT DOCUMENTS

| | | | |
|---|---|---|---|
| 2,906,314 | 9/1959 | Trevaskis et al. | 152/562 |
| 3,578,057 | 5/1971 | Knipp et al. | 152/557 |
| 3,815,652 | 6/1974 | Pouilloux | 152/562 |

FOREIGN PATENT DOCUMENTS 562137 6/1944 United Kingdom .

Primary Examiner—Robert A. Dawson
Assistant Examiner—Gregory J. Wilber
Attorney, Agent, or Firm—Joseph C. Gil; Aron Preis

[57] ABSTRACT

The present invention is directed to a tire comprising a three-dimensional wound reinforcement formed from a continuous sheathed filament running diagonally over the region upon which the tread is located and alternating from one tire foot to the other, said filament (i) crossing back and forth over said region, (ii) running into the tire foot tangentially, (iii) running for a relatively long distance in the tire foot, and (iv) crossing over itself over the entire tire shape, said reinforcement resisting forces radially and circumferentially, and an elastomeric material surrounding said reinforcement and to a method of manufacture thereof.

2 Claims, 5 Drawing Sheets

METHOD OF MAKING A TIRE REINFORCED WITH SHEATH CORD THREADS

The present application is a continuation of U.S. application Ser. No. 851,854 filed Apr. 14, 1986, now abandoned, which in turn is a continuation-in-part of U.S. application Ser. No. 789,676 filed Oct. 21, 1985, now abandoned, which in turn is a continuation of U.S. application 532,412 filed Sept. 15, 1983, now abandoned.

BACKGROUND OF THE INVENTION

This invention relates to tires having a reinforcement formed from a continuous sheathed filament running diagonally over the tread region and alternating from one tire foot to the other. This invention also relates to a process for the production of cast tires reinforced with cord threads.

British Patent 562,137 describes a tire, in which sheathed filaments are worked into a rubber carcass for reinforcement purposes. The filaments are positioned around the bead. This publication does not suggest how a cast tire which is equipped with sheathed filament as the reinforcement could be produced.

U.S. Pat. No. 3,578,057 describes a plastic pneumatic tire of polyurethane elastomer for very high internal pressures, which is produced in a casting process using a mold and a mold core ring, and which has reinforcing inserts. The reinforcing inserts are designed as partially sheathing the mold core. A spacing layer ensures that the windings of the reinforcing insert have a spacing from the inside surface of the tire and are thus completely sheathed by the elastomer. In this tire, each reinforcing thread only contacts the tire foot at one point. In this case, the tire foot is a weak point. It is not known how the reinforcing insert might be joined in a force-locking manner to the edge of any bead which may be present. (There is no bead edge described in this reference). Under a considerable strain, this tire first fails in the tire foot.

Proceeding from a tire of the type described in U.S. Pat. No. 3,578,057, an object of the present invention is to improve the design of the reinforcement in the tire foot, and to provide a process which allows an economic production of such tires.

DESCRIPTION OF THE INVENTION

Figure 1:
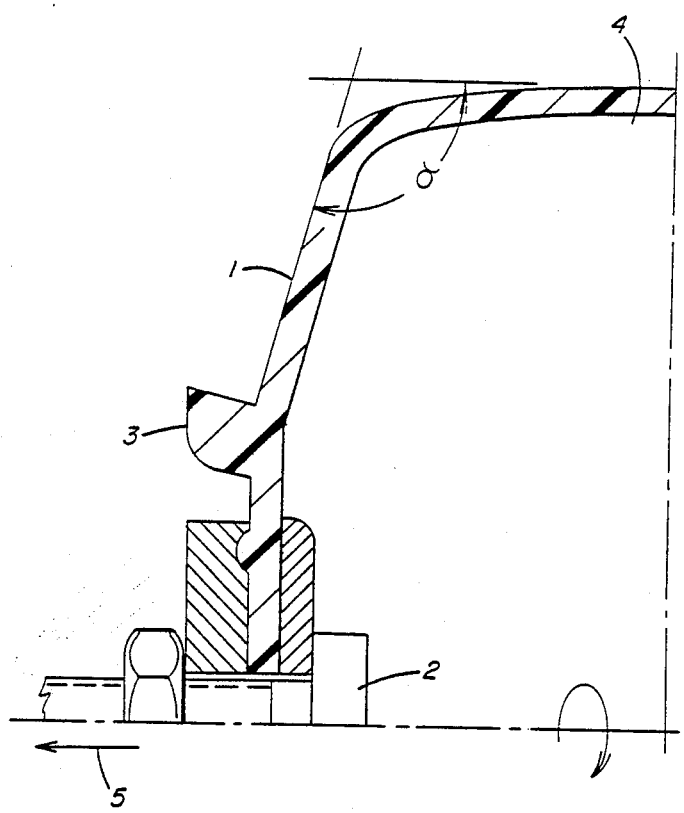
FIG. 1 shows a cross section through a bellows as the core having widening flanks.

The present invention is directed to a tire comprising a three-dimensional wound reinforcement formed from a continuous sheathed filament running diagonally over the region upon which the tread is located and alternating from one tire foot to the other, said filament (i) crossing back and forth over said region, (ii) running into the tire foot tangentially, (iii) running for a relatively long distance in the tire foot, and, (iv) crossing over itself over the entire tire shape, said reinforcement resisting forces radially and circumferentially, and an elastomeric material surrounding said reinforcement.

As noted in the tire of the present invention, the sheathed filament runs for some distance circumferentially in the tire foot. The distance depends on the strain to be placed on the tire. If the requirements are small, it is sufficient if the filament touches the tire foot only in one point. In other cases, the filament should run in the tire foot for a certain range, e.g., in a sector of 30° or more. In one specific embodiment, the filament runs at least once over the complete tire circumference (i.e., sector of 360°) in the tire foot.

A cast tire of this type may be produced by initially pre-fabricating the tire reinforcement by winding a continuous sheathed filament in an alternating manner over a rotating core by having non-narrowing flanks. The wound core can also be used for the core internal contour formation of the cast tire, or the reinforcement can be removed from the core after a fixing operation and introduced into a tire casting mold. The alternating around the rotating core is controlled during production of the reinforcement so that in the extreme positions during the core rotation, the continuous filament is pressed for some time onto a bead which is positioned on the core in a rotationally symmetrical manner in the region which would correspond to the tire foot. In a preferred embodiment, a tread reinforcement may also be formed by controlling the alternating around the rotating core so that the alternating width is restricted once or several times and the alternating speed is reduced during the operation.

The essence of the present invention is the reinforcement in the tire foot. Depending on how far the filament runs in the tire foot, any reinforcement of this region may be achieved. The resultant bead is automatically joined to, and is actually a part of, the reinforcement of the tread and of the tire side walls by the winding technique. Consequently, the tire stability is very high. An undesirable tire growth in the bead region is avoided. If required, a further reinforcing of the tread may be produced once or several times.

The term "continuous sheathed filament" is not meant to denote a single filament which is closed in itself. Even if several pieces of filament are used for the construction of the reinforcement, so few weak points are produced that separate precaution and steps do not have to be taken for the ends of the filament. The ends of the filament should preferably lie in the region of the bead. These weak points are not comparable with the beginnings and ends of core fabrics or webs conventionally used in tires. The continuous sheathed filament also ensures a high degree of uniformity. In the case of conventional cord fabric inserts, the uniformity is always impaired by overlaps or by the formation of folds.

It is important to use continuous sheathed filaments in the tires of the present invention. Consequently, the cores of superimposed sheathed filaments (as they occur at least in the tire foot) do not rub together directly, which would reduce the life considerably. Moreover, a desirable spacing of the actual reinforcing core of the sheathed filament which consists of metal or organic or inorganic fibers (for example steel, glass, cotton, polyester, polyamide, carbon, aramide) from the surface of the tire is achieved. By using different material and thickness of the sheathing of the filament, further degrees of freedom for optimizing the properties of the tire are possible. A sheathing with plastic or rubber is preferred. Means for improving the adhesion may also be applied. The thickness of the sheathing preferably ranges from 0.1 to 1.0 mm. Lacquering or an extrusion sheathing are preferred.

It is possible to produce different patterns of the reinforcement on the core by a suitable position of the alternating movement and of the core rotation. The spacing of the filaments from one another may also be exactly adjusted. A "mesh pattern" of a regular hold distribution may be produced. In the case of a "loose" reinforcement, a fixing operation may be necessary if the core, by which it is produced, is not also to be used simultaneously as the inside tire contour in the casting mold. For fixing, it is possible to use a suitable tacky filament. The reinforcement may also be subsequently bonded. It may also be covered by an adhering net or web, which stabilizes the reinforcement after drying. If the core is reused during casting, the filament is usually wound so firmly that a particular fixing operation may even be omitted.

It has also proved expedient to guide the filaments diagonally over the tread, lying closely together, which also contributes to a stabilization of the core. The required spacing of the "cores" of the sheathed filaments is adjusted by the sheathing. A casting operation is also possible in the case of a close winding of this type, because the preferred polyurethane casting systems may be adjusted to a low viscosity.

Due to a precise reinforcement without weak points, a relatively light tire may be produced which has outstanding properties.

The manner in which the core may be taken apart is not critical. It may be an elastic bellows which is stabilized by a pressure charging with air or preferably with a liquid. Bellows of this type are known and are described in, for example German Offenlegungsschriften 2,205,220, 2,124,978; and 3,042,576, or in U.S. Pat. No. 3,712,362. Separable metal cores are also suitable. The shape of the core is provided with the flanks which are not allowed to narrow, i.e., the foot region of the core, that is, where the necessary bead is positioned, must be at least as wide as the tread, otherwise the reinforcement according to the present invention cannot be produced simply, as a stretched filament cannot follow a concave contour. A reinforcement of this type may be inserted into a tire mold in which the tire width in the foot is smaller than the width of the tread or the width of the foot on the first core mold.

The production of the reinforcement according to the present invention will now be described in more detail in the following by way of example.

FIG. 1 shows a mold, on which a reinforcement according to the present invention may be produced. An elastic bellows 1 is clamped in a rotating apparatus 2. A bead 3 and an angle $\alpha > 90°$ differ from the conventional cores. The bead 3 is secured to the bellows 1 in a rotationally symmetrical manner at such a point where a bead wire would approximately lie in a finished conventional tire. It has been found that a precise, high-grade bellows 1 is necessary; in this way an exact inner contour of the tire can be achieved. In combination with the exact outer contour of the tire, an exactly dimensioned tire can be produced. Such an exact sizing leads to savings in terms of material. The bellows is filled with liquid 4 to increase the stability. The core may also be used for the formation of the inside contour when the tire is cast. The reinforcement or the reinforced tire is released from the mold by drawing the bellows attachment apart in the axial direction 5.

Bellows of this type are preferably produced from two half shells by friction welding. The bellows elastomer is formed, for example from a prepolymer and a chain extender. The prepolymer can be composed of 1 mol of polyester based on adipic acid, ethylene glycol, in a molecular weight of 2,000 and 2 mols of 2,4-toluylenediisocyanate. The NCO content is 3.6%. This prepolymer is diluted with 10% of propylene carbonate. The following data result:

| NCO content: | 3.25% |
|---|---|
| Viscosity at 80° C. | from 800 to 1.000 mPas |

The chain extender can consist of 90 parts by weight of polyester of adipic acid/ethylene glycol/butane diol, molecular weight 2,000, 10 parts by weight of 3,3',5,5'-tetraethyl-4,4'-diaminodiphenylmethane and 0.3 parts by weight of diazabicyclooctane.

100 parts by weight of the prepolymer/propylene carbonate mixture are mixed at 80° C. with 48 parts by weight of the chain extender, the temperature of which is controlled at 50° C. The molding temperature is 80° C. The processing times during stirrer mixing are as follows:

| Casting time: | about 10 seconds. |
|---|---|
| Molding time: | about 20 minutes. |
| Reheating time: | 12 h/80° C. |

The formulation may also be processed on high pressure metering/mixing units.

MECHANICAL PROPERTIES

| Tension test δ 100: | 2.83 MPa |
|---|---|
| δ B: | 46.7 MPa |
| ε B: | 700% |
| Tear propagation strength: | 39.4 KN/m |
| Pressure deformation residue (24 h/70° C.): | 22% |
| Impact elasticity: | 53% |
| Hardness: | 74 Shore A |

Half shells are produced from the above-mentioned reaction mixture in the reaction casting process. These half shells have in the annular surfaces an overlap of, e.g., 1 mm for friction welding. The two half shells are pressed together for about 120 seconds under a compression of 1.5 mm at a speed of 180 rpm. Another compression of 0.5 mm is carried out immediately after this friction procedure.

Figure 2:
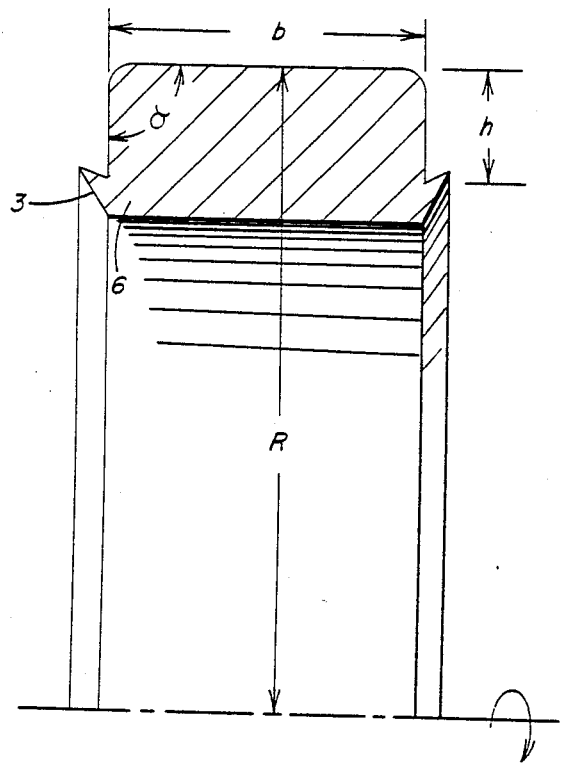
FIG. 2 shows a cross section through a separable core having straight flanks.

FIG. 2 shows another core cross section in the case of a separable metal core 6. In this case, the width of the reinforcement in the tire foot is approximately the same as the width of the tread, i.e., $\alpha$ is approximately 90°. The width b of the tread is 100 mm, the height h from the frame of the core to the tread is 37 mm and the maximum core radius R is 240 mm.

Figure 3:
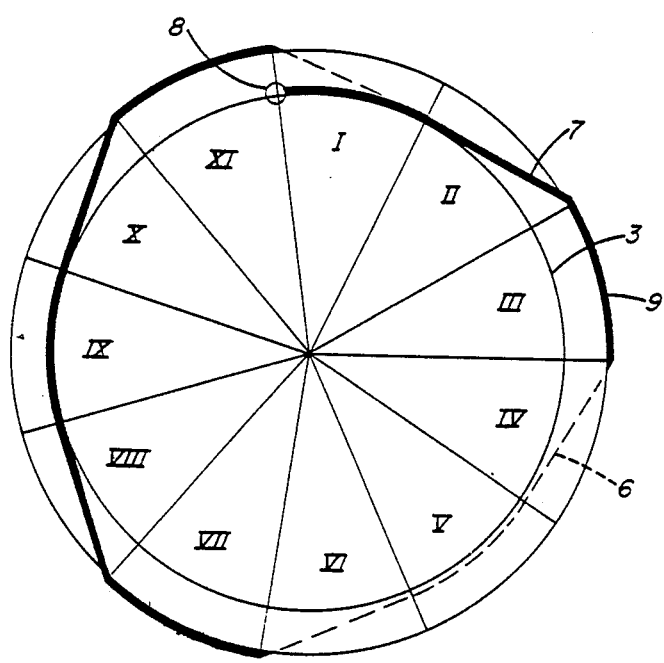
FIG. 3 is a side view of the windings of the core according to FIG. 2.

FIG. 3 is a side view of the winding of the core according to FIG. 2. The core is divided into eleven equal segments (labeled I through XI). The sheathed filament 7 is secured at a separating point 8 to the core bead 3. In segment I, the filament rests and runs on the circumference of the core bead. In segment II, by transverse motion, the filament leaves the bead tangentially and ascends along the front side wall to the periphery of the core. In the segment III, the filament passes over the peripheral area of the core and is again positioned on the side surface of the core. In segment IV, the filament descends on the back side wall 6 of the core until it touches the bead tangentially (shown by dotted line). In segment V, the filament runs on the circumference of the bead. In segment VI, the filament leaves the bead tangentially and ascends to the periphery of the core along the back side wall. In segment VII, the filament crosses the peripheral area to the front side wall. In segment VIII, the filament descends on the front side wall until it touches the bead tangentially. In segment IX, the filament runs on the circumference of the bead. In segment X, the filament leaves the bead tangentially and ascends to the periphery of the core along the front side wall. In segment XI, the filament crosses the peripheral area to the back side wall. The winding procedure is then repeated from that point.

Figure 6:
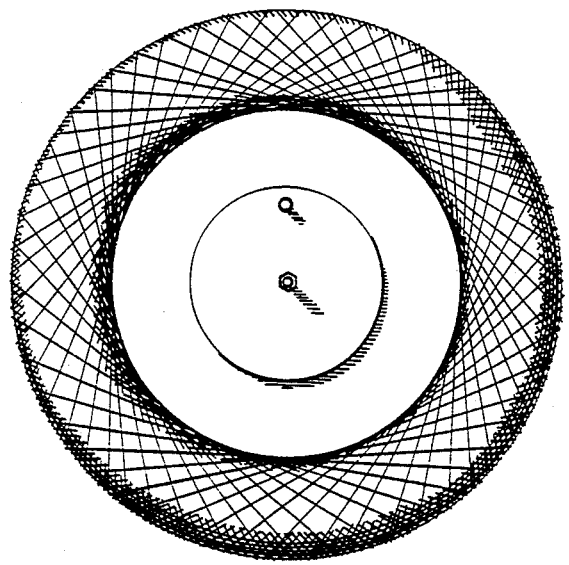
FIGS. 6, 7 and 8 are views of the wound core of the present invention.
Figure 7:
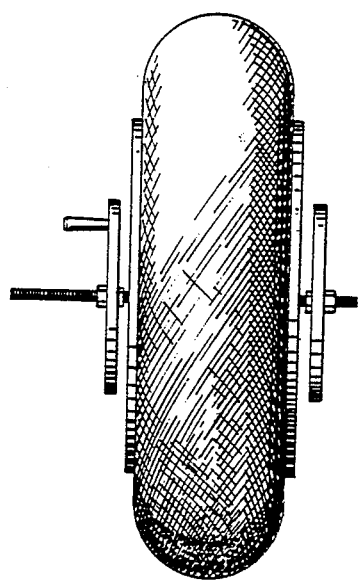
Figure 8:
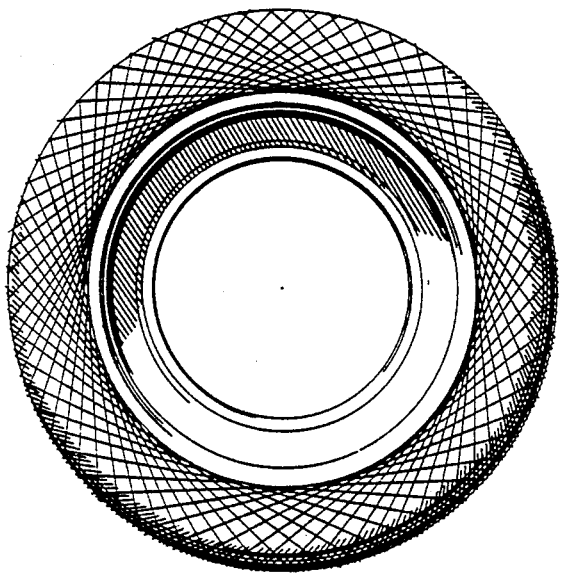

After eight complete rotations of the core, there would theoretically be an overlap with the portion of the filament which was positioned during the first rotation of the core. However, since a regular distribution of the filament is to be achieved, it is guided out slightly over one segment division, for example by a distance of from 2 to 3 filament widths. The winding is continued in this manner until all the core is covered with a regular latticework. FIGS. 6 through 8 illustrate such a wound core wherein the filament crosses over itself over the entire tire shape.

In this case, steel threads are used which are sheathed, by extrusion, with a thermoplastic polyurethane elastomer, for example Desmopan 385 or Desmopan 485, manufactured by Bayer AG. The cord threads were also impregnated in the dip process with an adhesive solution, for example Desmocoll 12 or Desmocoll 20, manufactured by Bayer AG, both being cross-linked with an isocyanate, for example Desmodur R or Desmodur RF, manufactured by Bayer AG, or with a PUR dispersion, for example Impranil DLN, manufactured by Bayer AG. During winding, the filament still has a slight tackiness. After drying, the stability of the reinforcement is so high that it may be removed from the core without damage.

In one embodiment of the present invention, the procedure is commenced as stated above, but a bundle of 20 windings is also wound with the same filament on one core bead, then a filament is wound spirally in the region of the tread in a spacing of two filaments and then 20 windings are again wound on the other core bead. Once the initially tacky impregnation has hardened, an inherently stable reinforcement is obtained which is reinforced in particular at critical points by the additional band and by the filament bundle in the region of the bead.

Figure 4:
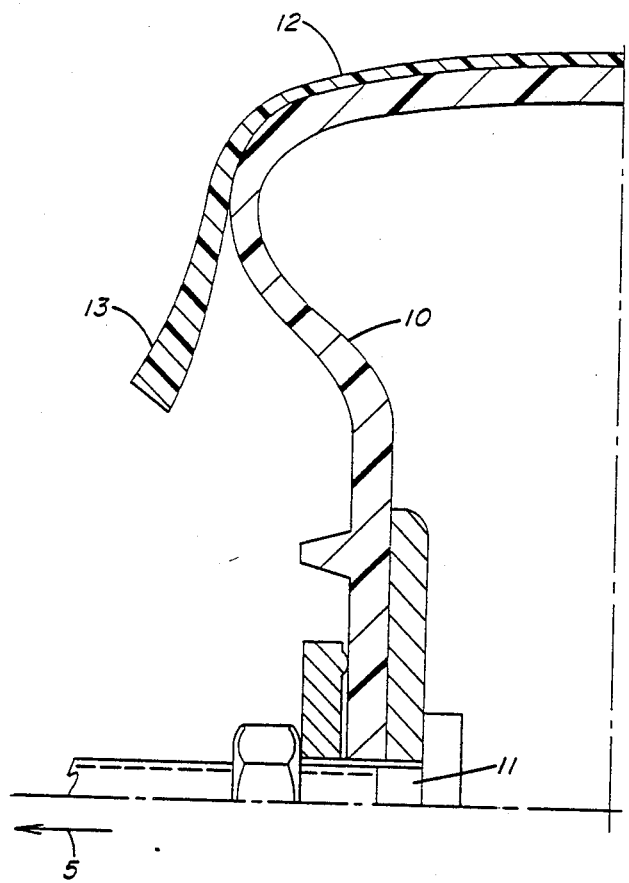
FIG. 4 shows a section of a reinforcement which is produced separately according to FIG. 1, lying on the core of a casting mold.

During a fixing of the filament, the reinforcement may be removed from the core mold. FIG. 4 shows the further processing of a reinforcement which has been produced on a core according to FIG. 1 ($\alpha > 90°$). In FIG. 4, the core mold for the cast tire consists of an armoured bellows 10 which is clamped in a rotation apparatus 11. The reinforcement 12 which is stable in itself (with the foot region 13 which is thickened in a manner typical of the present invention) does not initially rest on the bellows 10 in the foot region.

Figure 5:
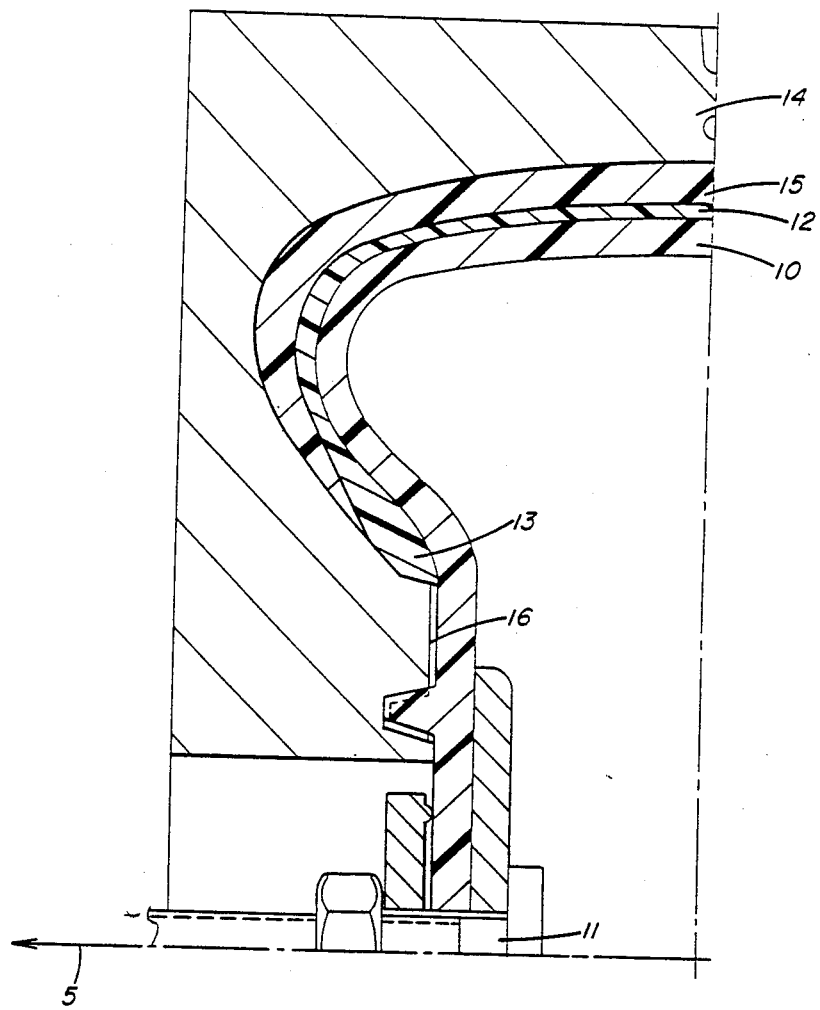
FIG. 5 shows a section of a reinforced tire in a casting mold.

Only in cooperation with the outer casting mold 14 in FIG. 5 is it possible to recognize the conventional tire cross section. The region which is mainly filled with the tire elastomer is denoted by reference number 15. Although it cannot be clearly seen in FIG. 5, the region directly on the core below the reinforcement and in the tire foot is completely sheathed and penetrated by elastomer.

For a bubble-free production of the tire, a careful air elimination is necessary via channels 16 in the contact surfaces on the bellows. During casting, the mold is in a vertical position. Casting is carried out from below via a film gate. Deaeration takes place in the zenith through vertically positioned ridges which run out in the parting plane as a high point and cut into the high points of the profiles.

Tires according to the present invention are produced using polyurethane casting elastomers, as they are described in, for example Kunststoff-Handbuch, Vol. VII, Polyurethane, 1966, Carl Hanser Verlag.

The invention is further illustrated, but is not intended to be limited by the following examples in which all parts and percentages are by weight unless otherwise specified.

EXAMPLES

Example 1

Copper-plated steel cord of dimensions $5 \times 0.25$ mm is drawn through an adhesive solution of Impranil DLN for 2 seconds and then dried.

The steel cord pretreated in this manner is wound onto a core, similar to the one in FIG. 2, having a width of 100 mm, a height from the core frame to the tread of 60 mm and a maximum core diameter of 450 mm.

The sheathed steel filament is secured in a ring in the left-hand bead wire region. The core is made to rotate. During 10 rotations, the filament is guided in the left-hand bead wire region. The filament guidance is then moved into the right-hand bead wire region, again for 10 rotations.

During a regular rotation of the core, the filament is guided such that in the extreme positions (right-hand and left-hand bead wire regions), it remains for half a rotation in each case and passes at intervals in each case over the outer contour of the core. The advance in the direction of rotation (in the middle of the core) is 5 mm in each case. A rhombic armouring is consequently produced.

Once all of the core has been sheathed with this rhombic armouring, the filament is guided at a constant speed of the core with an axial advance of 1.2 mm per rotation.

As a result of this, an additional armouring is produced in the bead region and a band armouring is obtained in the region of the tread. Once the tire has been covered over its complete width, the rotation is stopped, the filament is severed. The end of the filament is secured in the bead wire region by making a knot.

The core which is armoured or reinforced in this manner is introduced into the casting mold according to FIG. 5, and the mold is filled with the polyurethane reaction casting mixture.

Example 2

Filaments are used, consisting of a polyester cord of the construction d tex $1100 \times 3 \times 3$, sheathed with thermoplastic polyurethane elastomer Desmopan 384 in a thickness of 2 mm in diameter, and consisting of a copper-plated steel cord of the construction $3+9\times 1.175$ mm+0.15 mm, wetted with Impranil DLN.

A core is used which has the same dimensions as Example 1.

The sheathed polyester filament is secured in the bead region, the core is made to rotate and the filament is guided in an alternating manner so that a rhombic pattern is produced having a side length of 8 mm. After the core has been evenly covered, rotation is stopped, the sheathed polyester filament is severed in the bead region and secured, and the steel cord filament is then guided in the same way as in Example 1: In each case, 10 rotations in the bead region to the left and right, then alternating with four rhombic side lengths in the zenith and in each case in the bead region, remaining for half a rotation each and finally in the tread region a spiral winding over the complete width with a rise of 2 mm.

The end of the filament is again secured in the bead wire region.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process for the production of a cast tire reinforced with sheathed core threads and having at least one tire foot, the improvement comprising prefabricating tire reinforcement by winding a continuous cord thread in an alternating manner on to a core, the alternation being controlled in such a manner that at each turning point of said alternation, said continuous cord thread is guided for a predetermined length in a rotationally, symmetric manner in the region of the tire foot, said prefabricating being characterized by the following:
    (a) the continuous cord thread is wound onto a rotating core with non-narrowing flanks; and either
    (b1) the wound core is used to form the core's internal contour of the cast tire; or
    (b2) the tire reinforcement is removed from the core after a fixing operation and is introduced into a tire casting mold; and
    (c) the alternation is controlled in such a manner that at said turning points the continuous cord thread is pressed at least once on each side for the duration of at least one rotation against a bead provided in a rotationally symmetric manner on the core, in the region of the tire foot.

2. The process of claim 1, characterized in that the alternation and the rotation of the core are controlled in such a manner that the alternation width is also restricted at least once concurrent with reducing the speed of said alternating so that an additional reinforcement is formed in the circumferential direction in the form of a tread reinforcement.

* * * * *